(12) United States Patent
Shiratori et al.

(10) Patent No.: US 8,599,511 B2
(45) Date of Patent: Dec. 3, 2013

(54) APPARATUS FOR CONTROLLING WRITING DATA AND METHOD FOR THE SAME

(75) Inventors: Toshiyuki Shiratori, Tokyo (JP); Kohei Taguchi, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 281 days.

(21) Appl. No.: 13/005,698

(22) Filed: Jan. 13, 2011

(65) Prior Publication Data

US 2011/0176238 A1  Jul. 21, 2011

(30) Foreign Application Priority Data

Jan. 15, 2010 (JP) ................. 2010-007475

(51) Int. Cl.
*G11B 15/24* (2006.01)
(52) U.S. Cl.
USPC .......................................... 360/72.1
(58) Field of Classification Search
None
See application file for complete search history.

(56) References Cited

U.S. PATENT DOCUMENTS

| | | | |
|---|---|---|---|
| 6,856,479 B2 | 2/2005 | Jaquette et al. | |
| 6,865,043 B2 | 3/2005 | Ataku et al. | |
| 7,236,322 B2 * | 6/2007 | Greco et al. | 360/75 |
| 7,350,021 B2 * | 3/2008 | Itagaki et al. | 711/111 |
| 7,710,681 B2 * | 5/2010 | Itagaki et al. | 360/73.01 |
| 7,903,363 B2 * | 3/2011 | Itagaki et al. | 360/71 |
| 8,035,912 B2 * | 10/2011 | Katagiri et al. | 360/73.08 |
| 8,316,162 B2 * | 11/2012 | Katagiri et al. | 710/52 |

FOREIGN PATENT DOCUMENTS

| | | |
|---|---|---|
| JP | S60171685 A | 9/1985 |
| JP | S6367661 A | 3/1988 |
| JP | S63168889 A | 7/1988 |
| JP | 4125725 | 4/1992 |
| JP | H0541037 A | 2/1993 |
| JP | H0554537 A | 3/1993 |
| JP | H0863296 A | 3/1996 |
| JP | 2003257152 A | 9/2003 |
| JP | 2004095072 A | 3/2004 |
| JP | 2005044357 A | 2/2005 |
| JP | 2006190392 A | 7/2006 |
| JP | 2008299530 A | 12/2008 |

OTHER PUBLICATIONS

Felix EHM, "Development of a Perfornnant Defragmentation Process for a Robotic Tape Library within the CASTOR HSM," http://castor.web.cern.ch/castor/docs/guides/DiplomaThesis.pdf, 2006.

(Continued)

*Primary Examiner* — K. Wong
(74) *Attorney, Agent, or Firm* — Griffiths & Seaton PLLC (57) ABSTRACT

In a controller of a tape drive, when a command processor receives a command for moving to the end of data ("EOD") or the like, an operation signal output unit suspends the moving of a tape and a cartridge memory ("CM") input/output unit stores therein a state of the tape in which the moving has been omitted. Then, when the command processor receives a command for writing data in this state, the CM input/output unit writes the data to a cartridge memory. Subsequently, for example, when a head passes a proper position at which the data should be actually written to the tape, the CM input/output unit reads the data from the cartridge memory, and the channel input/output unit writes the data to the tape at the proper position.

19 Claims, 7 Drawing Sheets

(56) References Cited

OTHER PUBLICATIONS

Tim Bell, "Tape Efficiency Version 0.5," https://twiki.cern.ch/twiki/pub/FIOgroup/TapeRefCernUsageNov2007/tape_usage_efficiency_v05.pdf, Nov. 2007, 19 pages.

C. Curran, "The Unbearable Slowness of Tape," http://hepix.caspur.it/storage/hep_pdf/2008/Spring/hepix8.pdf, May 2008, 26 pages.

U.S. Appl. No. 12/909,765, entitled "Linear Recording Device for Executing Optimum Writing Upon Receipt of Series of Commands Including Mixed Read and Write Commands and a Method for Executing the Same," as filed Oct. 21, 2010.

* cited by examiner

APPARATUS FOR CONTROLLING WRITING DATA AND METHOD FOR THE SAME

PRIORITY CLAIM

This application claims priority to Japanese Patent Application No. 2010-7475, filed Jan. 15, 2010, which is hereby incorporated by reference in its entirety.

BACKGROUND OF THE INVENTION

1. Field of the Invention

The present invention relates to an apparatus and a method for controlling writing data, and more particularly, relates to an apparatus and a method for controlling writing data to a tape medium.

2. Description of the Related Art

There is a system which is equipped with tape media such as magnetic tapes and repeats writing and reading operations of relatively small amounts of data to and from each tape medium (for example, see Felix Ehm, "Development of a Performant Defragmentation Process for a Robotic Tape Library within the CASTOR HSM," (online), 2006, (searched on Dec. 9, 2009), the Internet URL:http://castor-.web.cern.ch/castor/docs/guides/DiplomaThesis.pdf ("Ehm"), Tim Bell, "Tape Efficiency Version 0.5," (online), November 2007, (searched on Dec. 9, 2009), the Internet, URL:https://twiki.cern.ch/twiki/pub/FIOgroup/TapeRefCernUsageNov2007/tape_usage_efficiency_v05.pdf ("Bell"), and C. Curran, "The Unbearable Slowness of Tape," (online), May 2008, (searched on Dec. 12, 2009), the Internet <URL:http://hepix.caspur.it/storage/hep_pdf/2008/Spring/hepix8.pdf>("Curran")). Since a tape medium is a removable recording medium, writing or reading data requires the tape medium to be loaded on a tape drive. In addition, since the tape medium is a sequentially accessed recording medium, writing or reading data also requires a head for writing or reading to be moved to a writing position or a reading position on the tape medium. Thus, in general, such a system repeatedly performs operations such as moving a tape cartridge from a storage place to a tape drive (Move Medium), loading the tape cartridge on the tape drive (Load), moving a head of the tape drive to a writing or reading start position (Locate/Space), writing or reading data (Write/Read), rewinding the tape medium (Rewind/Unload), unloading the tape cartridge from the tape drive (Unload) and moving the tape cartridge to the storage place (Move Medium).

Generally, times required for the above operations are: several tens of seconds to move the tape cartridge from the storage place to the tape drive and to load the tape cartridge on the tape drive; several tens of seconds on average to move the tape medium of the tape cartridge to a writing or reading start position and to rewind the tape medium; and several tens of seconds to unload the tape cartridge from the tape drive and to move the tape cartridge to the storage place. These operations thus requiring a total of several minutes are an overhead of data writing or reading which can be completed in several seconds. In this sense, it can be said that the tape medium is used in an unsuitable manner in the system described in Ehm, Bell, and Curran mentioned previously.

SUMMARY OF THE INVENTION

An object of the present invention is to shorten a time required for a moving operation of a tape medium in writing data to the tape medium.

To solve the above problem, the present invention provides an apparatus for controlling writing data to a tape medium, comprising a movement control unit that, even when a moving operation of the tape medium is instructed to locate a head to a position specified on the tape medium, performs control to suspend the moving operation of the tape medium if the specified position satisfies a predetermined condition and a writing unit that, when an instruction to write data to the tape medium is issued while the moving operation is suspended under the control of the movement control unit, writes the data to a storage unit in association with the specified position, the storage unit enabling the writing to be ready to perform within a shorter time than a time required for the moving operation.

Here, the invention may further comprise a reading unit that reads the data from the storage unit even when an instruction to read the data from the tape medium is issued.

In addition, the invention may further comprise a rewriting unit that rewrites the data written to the storage unit by the writing unit to the tape medium at the specified position stored in the storage unit in association with the data.

In this case, the storage unit may be non-volatile, and the rewriting unit may rewrite the data written to the storage unit by the writing unit to the tape medium at the specified position, after a tape cartridge including the tape medium unmounted from a tape drive is again mounted on the tape drive.

In addition, the rewriting unit may rewrite the data written to the storage unit by the writing unit to the tape medium at the specified position, when a free space of the storage unit satisfies a predetermined condition.

Further, the rewriting unit may rewrite the data written to the storage unit by the writing unit to the tape medium at the specified position, when the head passes the specified position in a moving operation of the tape medium in a direction of writing the data.

Moreover, the invention also provides a method for controlling writing data to a tape medium, comprising the steps of even when a moving operation of the tape medium is instructed to locate a head to a position specified on the tape medium, omitting the moving operation if the specified position satisfies a predetermined condition and writing data to a storage unit in association with the specified position when an instruction to write the data to the tape medium is issued while the moving operation is being omitted, the storage unit enabling the writing to be ready to perform within a shorter time than a time required for the moving operation.

Further, the invention also provides a method for controlling writing data to a tape medium, comprising the steps of when a moving operation of the tape medium is instructed to locate a head to a first position on the tape medium, omitting the moving operation; writing first data to a storage unit in association with the first position when an instruction to write the first data to the tape medium is issued while the moving operation is being omitted, the storage unit enabling the writing to be ready to perform within a shorter time than a time required for the moving operation reading second data written to the tape medium and ended at a second position which is farther from a beginning of the tape medium than the first position is; and when the tape medium is rewound from the second position, rewriting the first data written to the storage unit to the tape medium at the first position stored in the storage unit in association with the first data.

Further, the invention also provides a program that causes a computer to function as an apparatus for controlling writing data to a tape medium, the program causing the computer to function as: a movement control unit that, even when a moving operation of the tape medium is instructed to locate a head to a position specified on the tape medium, performs control to suspend the moving operation of the tape medium if the specified position satisfies a predetermined condition; and a writing unit that, when an instruction to write data to the tape medium is issued while the moving operation is suspended under the control of the movement control unit, writes the data to a storage unit in association with the specified position, the storage unit enabling the writing to be ready to perform within a shorter time than a time required for the moving operation.

Furthermore, the invention also provides a tape cartridge used by being loaded on a tape drive, comprising: a tape medium to which data is to be written; a storage unit which enables writing to be ready to perform within a shorter time than a time required for a moving operation of the tape medium for locating a head to a position specified on the tape medium, and stores data instructed to be written to the tape medium at the specified position while the moving operation is being omitted.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Hereinbelow, a description is given in detail of an embodiment of the present invention by referring to the attached drawings.

Figure 1:
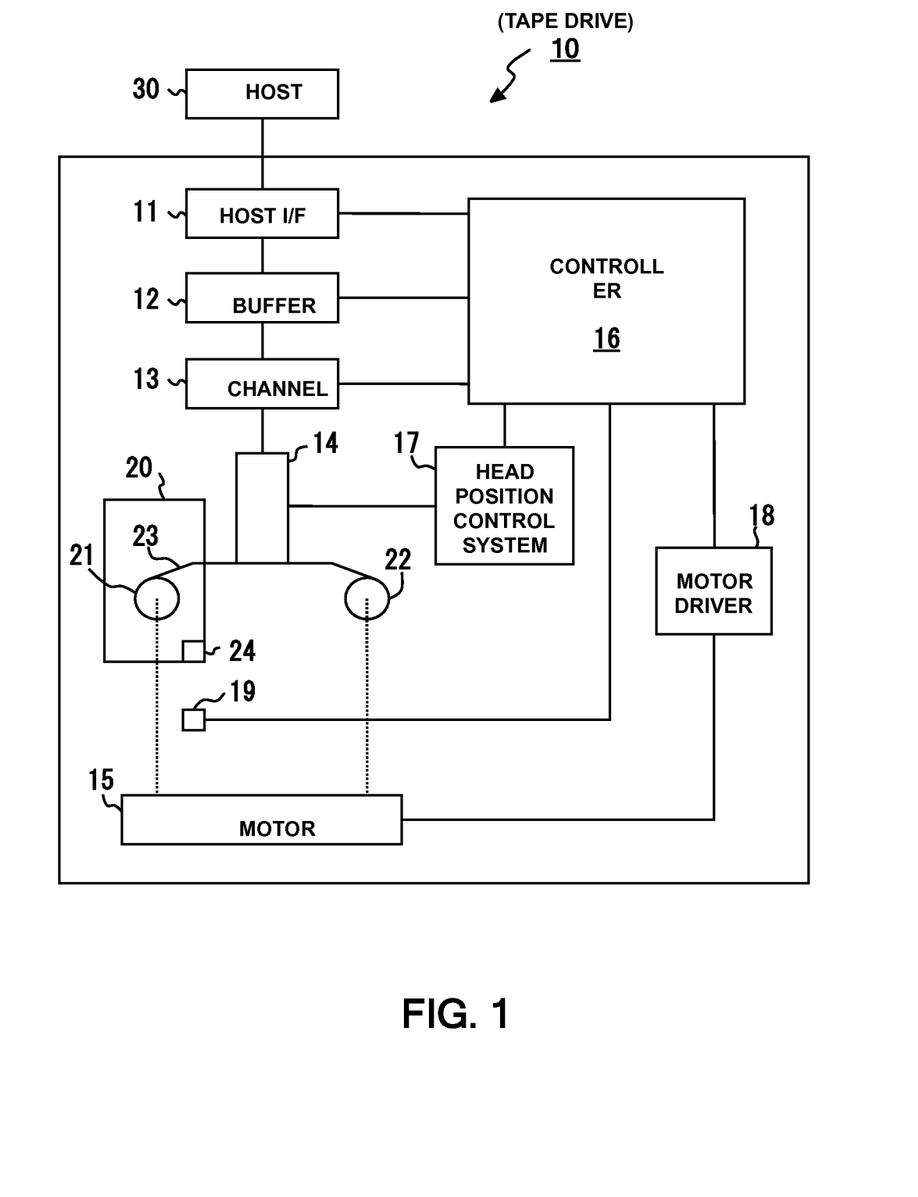
FIG. 1 is a block diagram showing a configuration of a tape drive to which an embodiment of the present invention is applied.

FIG. 1 is a diagram showing a configuration example of a tape drive 10 to which this embodiment is applied. The tape drive 10 includes a host interface (hereinafter, referred to as a "host I/F") 11, a buffer 12, a channel 13, a head 14, and a motor 15, and also includes a controller 16, a head position control system 17, and a motor driver 18. Furthermore, a tape cartridge 20 is also illustrated, since the tape cartridge 20 is loadable on the tape drive 10 by being inserted into the tape drive 10. The tape cartridge 20 includes a tape 23 wound around reels 21, 22. With the rotation of the reels 21, 22, the tape 23 is moved in a longitudinal direction thereof, from the reel 21 to the reel 22, or from the reel 22 to the reel 21. A magnetic tape is exemplified as the tape 23, but a tape medium other than the magnetic tape may be used.

The tape cartridge 20 also includes a cartridge memory 24. The cartridge memory 24 records information on, for example, how data is written to the tape 23. Data can be accessed at a high speed by checking indexes of the data written to the tape 23 and usage of the tape 23 in a non-contact manner by using an RF interface, for example. Note that an interface, like the RF interface, for accessing the cartridge memory 24 is shown as a cartridge memory interface (hereinafter, referred to as a "CM I/F") 19 in FIG. 1.

Meanwhile, the host I/F 11 communicates with a host 30 which is an example of a host system of the tape drive 10. For example, from the host 30, the host I/F 11 receives a command for writing data to the tape 23, a command for moving the tape 23 to a target position, and a command for reading data from the tape 23. Incidentally, SCSI is exemplified as a communication standard used for the host I/F 11. In SCSI, a first command corresponds to a Write command; a second command, a Locate command or a Space command; a third command, a Read command. The host I/F 11 responds to the host 30, whether processing in response to a corresponding one of the commands succeeds or fails.

The buffer 12 is a memory in which data to be written to the tape 23 and data read from the tape 23 is accumulated. For example, the buffer 12 is configured of a dynamic random access memory (DRAM). In addition, the buffer 12 is formed of multiple buffer segments, and each buffer segment stores therein a dataset which is a unit of reading from and writing to the tape 23.

The channel 13 is a communication channel used for transmitting to the head 14 data to be written to the tape 23, and for receiving from the head 14 data read from the tape 23.

When the tape 23 moves in the longitudinal direction, the head 14 writes or reads information to or from the tape 23.

The motor 15 rotates the reels 21, 22. Although the motor 15 is shown by a single rectangle in FIG. 1, it is preferable to provide a total of two motors 15, one for each of the reels 21, 22.

The controller 16 controls the tape drive 10 on the whole. For example, the controller 16 controls reading or writing data to or from the tape 23 in accordance with a command received by the host I/F 11. The controller 16 also controls the head position control system 17 and the motor driver 18.

The head position control system 17 is a system which searches for a desired wrap. The wrap is a group of multiple tracks of the tape 23. When there arises a need for moving to a different wrap, electrical switching of the head 14 is also required. The head position control system 17 controls such switching.

The motor driver 18 drives the motor 15. When the two motors 15 are provided as described above, two motor drivers 18 should be provided.

The CM I/F 19 is implemented, for example, by an RF reader/writer. The CM I/F 19 writes and reads information to and from the cartridge memory 24.

Here, consider a case where an appending operation is performed on the tape drive 10 having this configuration. In the appending operation, data is written to the tape medium after moving to a position of an end of data (EOD) which is behind the last data on the tape medium. In this case, a time Tappend required for appending data on a single tape cartridge is obtained as the sum total of the following times. Note that times required for moving the tape cartridge 20 from a storage place to the tape drive 10 and vice versa are omitted here.

(1) A Time Tmount Required for Mounting a Tape Cartridge

Tmount is a value specific to a tape drive, and is 12 seconds in a tape drive in a fourth generation Linear Tape-Open (LTO4).

(2) A Time Tpositioning Required for Moving to the EOD

Tpositioning is a variable value depending on the position of the EOD on the tape medium. An LTO4 tape cartridge has a tape length of 820 m, and a moving speed of approximately 8 msec. Since the EOD is located between the beginning of tape (BOT) and the end of tape (EOT) in the longitudinal direction of the tape medium, the Tpositioning is approximately 57 seconds on average, and approximately 100 seconds at maximum.

(3) A Time Twrite Required for Writing Data to a Tape Medium

Twrite is a variable value depending on an amount of data to be written (write data amount) and a writing rate of a tape drive or a data transfer rate of a host, and is 120 MB/sec in the LTO4 tape drive.

(4) A Time Trewind Required for Moving to the BOT

Trewind is a variable value depending on a new position of the EOD determined by the write data amount, and is approximately 100 seconds at maximum in the LTO4 tape drive, like Tpositioning.

(5) A Time Tunmount Required for Unmounting a Tape Cartridge

Tunmount is a value specific to a tape drive and is 17 seconds in the LTO4 tape drive.

When the write data amount is denoted by Qdata (MBytes), the performance of an appending operation is calculated by an equation "Qdata (MBytes)/Tappend (sec)=Qdata (MBytes)/(Tmount+Tpositioning+Twrite+Trewind+Tunmount)."

Note that the performance varies depending on the variable values. That is, in the above equation, the performance of the appending operation is influenced by the three variable values of Tpositioning, Twrite and Trewind.

Among these, the writing time Twrite is increased, as the write data amount is increased. However, if the write data amount is small to some extent, the writing time Twrite does not influence the performance so much. Rather, the two moving times Tpositioning and Trewind have a larger impact on the performance.

For example, a hierarchical storage management (HSM) system has a data writing time Twrite of one second or less to approximately 80 seconds. In contrast, each of the two moving times Tpositioning and Trewind is approximately 100 seconds, if the EOD before or after writing data is close to the EOT. In this case, the closer to the EOT the EOD before or after the writing is, the larger the two moving times Tpositioning and Trewind are.

Hence, in this embodiment, the two moving times are made shorter.

In order to achieve the above, this embodiment uses a non-volatile storage area incorporated in the tape cartridge 20. As the non-volatile storage area, any storage area or any storage medium may be used as long as writing data thereto is possible immediately after mounting of the tape cartridge 20 is completed and data reading is possible even when the tape cartridge 20 is unmounted and then mounted again because the data is held therein. A description is given below on the assumption that the cartridge memory 24 provided in the tape cartridge 20 is used. In other words, this embodiment uses the cartridge memory 24 as an example of a storage unit. However, the cartridge memory 24 has a small capacity in the present state and reading therefrom and writing thereto are performed in non-contact communication, and thus conceivable is such a configuration that information for managing data and the tape cartridge 20 is stored in the cartridge memory 24, and data itself is stored in a non-volatile memory such as a flash memory or a special storage area on the tape 23. Note that the tape drive 10 is preferably capable of accessing the non-volatile storage area in almost the same manner as in reading from and writing to the tape 23.

The tape drive 10 operates as follows.

First, the tape drive 10 recognizes that an appending operation is requested after the completion of mounting of the tape cartridge 20. Then, the tape drive 10 omits a moving operation to be performed before the appending operation in response to a move command. That is, the moving operation is not performed or is suspended.

Specifically, the tape drive 10 operates as follows.

For example, when receiving a Space EOD command (a command for moving to the EOD, the command issued by specifying the EOD) or a Locate command (a command for moving to the EOD, the command issued by specifying an absolute address), the tape drive 10 omits the moving operation but issues a completion report of the moving operation, because an appending operation is highly likely to occur. Here, the position specified by the move command is the EOD, and this is an example in which the specified position satisfies a predetermined condition.

On the other hand, when receiving a command other than the above, the tape drive 10 may omit the moving operation likewise, or alternatively may perform the moving operation. In this case, when the next command is a write command, a writing start position is a new EOD, and the writing operation is the same as an appending operation at the EOD. When the next command is a read command, a moving operation to the specified position is performed to read data. When the next command is a move command, the tape drive 10 may issue a completion report to the host 30 before the completion of the operation and then receive the next command.

Next, when receiving a request for appending data, the tape drive 10 temporarily stores the data in a non-volatile storage area such as the cartridge memory 24.

At this time, the tape drive 10 does not write the data at a position on the tape 23 at which the data should be actually written (proper position), except for a case where a predetermined condition is satisfied, such as a case where an unused area in the non-volatile storage area is equal to or less than a threshold at a time of start of data writing, or a case where an unused area in the non-volatile storage area runs short during the data writing. The tape drive 10 performs processing so that it seems to the host 30 that the data temporarily stored in the non-volatile storage area is written to the tape 23 at the proper position. That is, the host 30 is not aware of the presence of the non-volatile storage area. Specifically, in response to a command for moving data written to the non-volatile storage area or for reading such data, the tape drive 10 performs processing as if the data were written to the tape 23 at the proper position. In addition, in response to a rewind or unmount command, the tape drive 10 performs the rewinding or the unmounting without rewriting the data temporarily stored in the non-volatile storage area to the tape 23 at the proper position.

Note that the data written to the non-volatile storage area is held even after the tape cartridge 20 is unmounted.

Figure 2:
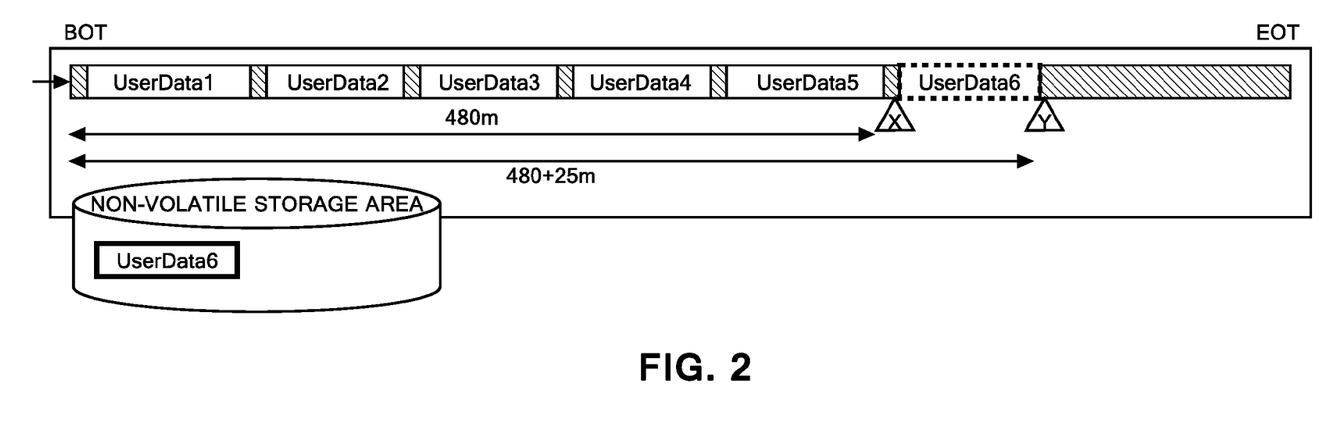
FIG. 2 is a diagram showing how data to be appended on a tape (append data) is stored in a non-volatile storage area in the embodiment of the present invention.

FIG. 2 shows an overview of such operations.

In FIG. 2, UserData1 to UserData5 are recorded on the tape 23. In other words, a position X behind UserData5 is an EOD at this time. In a case of writing UserData6 in this state, the tape drive 10 omits moving from the BOT to the EOD, and writes UserData6 to the non-volatile storage area as shown by the area surrounded by a thick solid line, on condition that the non-volatile storage area does not overflow. If UserData6 were written to the tape 23 as shown by the area surrounded by a thick broken line, a position Y behind the UserData6 would be a new EOD. However, UserData6 is written to the non-volatile storage area, and thereby the tape 23 can be unmounted without the need for a rewinding operation from the new EOD to the BOT.

Here, an embodiment is given by comparing cases of performing and not performing the moving operation for the appending operation. Note that in the description below, Pos(x) is a coordinate of the position X of an EOD in the longitudinal direction of the tape 23 with UserData1 to UserData5 recorded thereon, and is 480 (m). In a case where: an amount of data appended one time is 480 (MB); data amount of one data set is approximately 1.6 (MB); and the length of one data set is 82 (mm), the length of data appended one time is approximately 25 (m) (=82 (mm)×480 (MB)/1.6 (MB)). In addition, in a case where Pos(y) is a coordinate in the longitudinal direction of the position Y which is a new EOD after appending of UserData6 to the tape 23, Pos(y)=Pos(x)+25 (m). Furthermore, a data transfer rate is 120 (MB/sec), and a rate of the tape 23 is 8 (m/sec).

In an embodiment, the moving operation is performed for the appending operation.

In this case, the time Tappend required for a single appending operation is expressed as follows by using the writing time Twrite, a moving time Tpos(x) from the BOT to the EOD and the moving time Trewind from a new EOD to the BOT.

$$Tappend = Tpos(x) + Twrite + Trewind$$

Note that, in the equation, mounting and unmounting times which are fixed values are eliminated, and a sum of the above three times which are variable values are used.

Here, Twrite, Tpos(x) and Trewind take on the following values.

$$Twrite = 480(MB)/120(MB/sec) = 4(sec)$$

$$Tpos(x) = 480(m)/8(m/sec) = 60(sec)$$

$$Trewind = \{480(m)+25(m)\}/8(m/sec) = 63.125(sec)$$

A time Tappend(n) required for the n-th appending operation is as follows.

$$Tappend(n) = Tpos(x)(n) + Twrite + Trewind(n) = \{Pos(x) + 25*(n-1)\}/8 + Twrite + \{Pos(x) + 25*n\}/8$$

The equation shows that the larger n is, the higher percentage the two moving times account for.

In another embodiment, the moving operation is not performed for the appending operation.

In this case, if the non-volatile storage area overflows with the seventh appending operation, the moving time for the first to sixth moving operations is zero. Data needs to be written to the tape 23 at the proper position for the seventh appending operation. The time Tappend required for this appending operation is expressed as follows by using the writing time Twrite, a moving time Tpos(x) from the BOT to the EOD and the moving time Trewind from a new EOD to the BOT.

$$Tappend = Tpos(x) + 7*Twrite + Trewind$$

Note that, in the equation, mounting and unmounting times which are fixed values are eliminated, and a sum of the above three times which are variable values are used.

Here, Twrite, Tpos(x) and Trewind take on the following values.

$$Twrite = 480(MB)/120(MB/sec) = 4(sec)$$

$$Tpos(x) = \{480(m)+25(m)*6\}/8(m/sec) = 78.75(sec)$$

$$Trewind = \{480(m)+25(m)*7\}/8(m/sec) = 81.875(sec)$$

Specifically, in this case, it takes some time to perform an appending operation involving a rewriting operation, while it does not take time to perform an appending operation involving no rewriting operation.

Then, when the tape cartridge 20 is mounted, the tape drive 10 recognizes that data has been written to the non-volatile storage area, and writes the data to the tape 23 at the proper position. In order to achieve this, the tape drive 10 holds the data in the buffer 12 until the tape cartridge 20 is unmounted. Data which is rewritten to the tape 23 at the proper position before the tape cartridge 20 is unmounted can be deleted from the buffer 12. In addition, if the tape cartridge 20 is unmounted before data is rewritten, the data is read from the non-volatile storage area to the buffer 12 as necessary when the tape cartridge 20 is mounted again.

Meanwhile, a data rewriting operation may be performed in the course of a moving operation.

Figure 3:
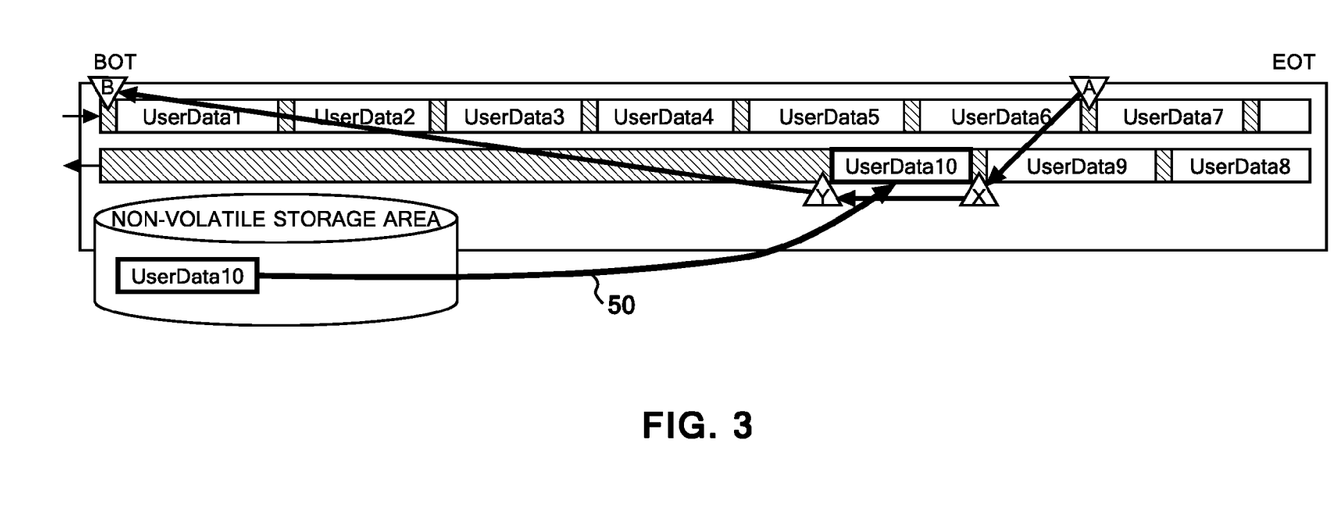
FIG. 3 is a diagram showing how the append data stored in a non-volatile storage area is rewritten to the tape medium in the embodiment of the present invention.

FIG. 3 shows an overview of such operations.

FIG. 3 shows a case where the tape drive 10 receives a command for reading UserData6 while UserData10 is stored in the non-volatile storage area. In this case, when a command for moving to the BOT (a rewind) is received after UserData6 is read, the head 14 passes a proper position for writing UserData10, in the course of a moving operation from the position A to the BOT. Note that a distance of moving from the position A to a position B is the same as a distance of moving from the position A to the position B via the positions X and Y. Accordingly, UserData10 is rewritten to the tape 23 at the proper position as shown by an arrow 50. Note that such a rewriting operation is an example of rewriting data to a tape medium at a specified position thereon when the head 14 passes the specified position in the course of a moving operation of the tape medium in a direction of writing data.

In this case, data stored in the non-volatile storage area can be read at any timing.

Performing the rewriting operation in the course of a moving operation prevents the non-volatile storage area from overflowing during the appending operation. In other words, this operation is executed whenever the head 14 passes an area that should be rewritten, regardless of use ratio of the non-volatile storage area.

Next, a description is given of a functional configuration of the controller 16 for carrying out such an operation. Note that the description is given below on the assumption that the cartridge memory 24 is used as the non-volatile storage area.

Figure 4:
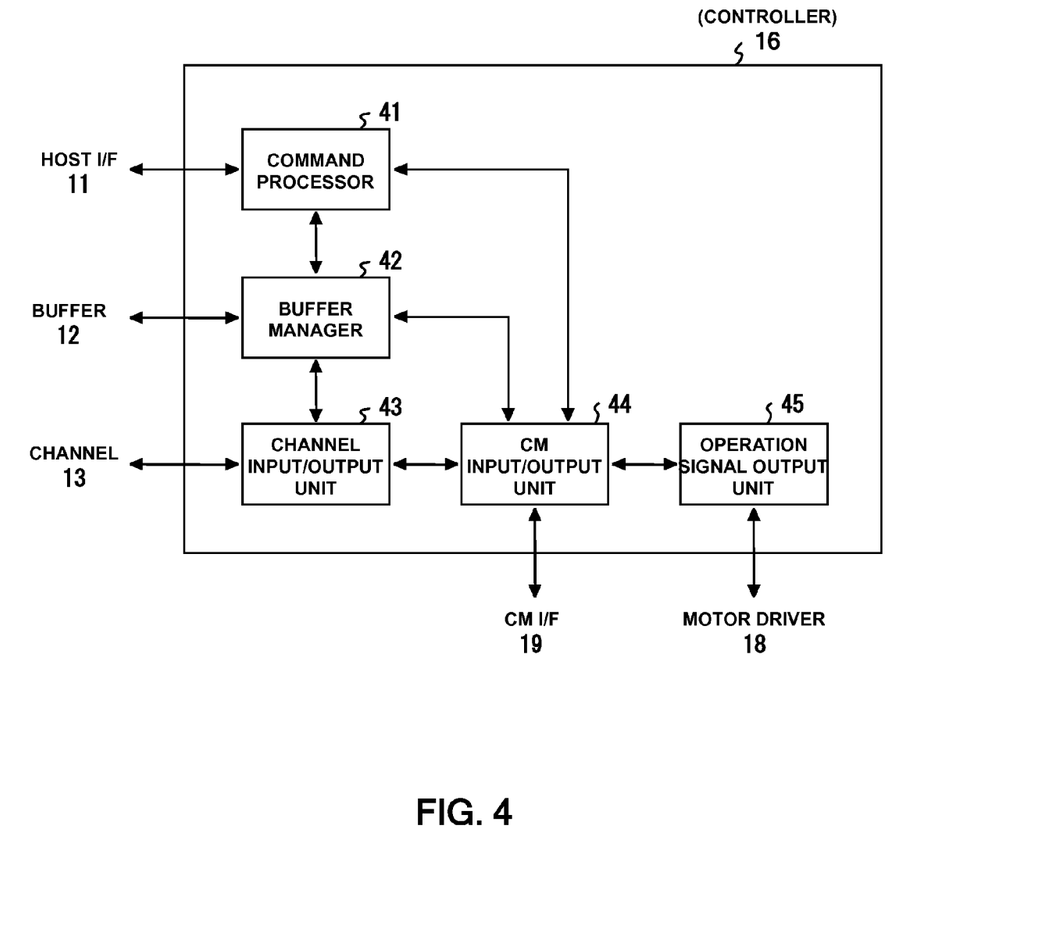
FIG. 4 is a block diagram showing an example of a functional configuration of a controller in the embodiment of the present invention.

FIG. 4 is a block diagram showing an example of a functional configuration of the controller 16.

As shown in FIG. 4, the controller 16 includes a command processor 41, a buffer manager 42, a channel input/output unit 43, a cartridge memory input/output unit (hereinafter, referred to as a "CM input/output unit") 44 and an operation signal output unit 45.

The command processor 41 receives commands from the host I/F 11. The commands include: for example, a Write command for writing data to the tape 23; a Read command for reading data from the tape 23; and a Space command and a Locate command for moving the tape 23 so that the head 14 can be located to a writing position or a reading position on the tape 23.

The buffer manager 42 stores in the buffer 12 data to be written to the tape 23 and data read from the tape 23, reads data stored in the buffer 12 to output the data to the channel input/output unit 43 or the command processor 41, and so on.

The channel input/output unit 43 outputs to the channel 13 data read from the buffer 12 by the buffer manager 42, outputs data received from the channel 13 to the buffer manager 42, and so on. In this embodiment, the channel input/output unit 43 is provided as an example of a rewriting unit which rewrites data to a tape medium at a specified position thereon.

The CM input/output unit 44 acquires information pieces stored in the cartridge memory 24, and performs various determinations based on the information pieces. As one of the information pieces stored in the cartridge memory 24, there is first cited a logical EOD showing a position on the tape 23 of the last data sent to the tape drive 10 by the host 30 (hereinafter, referred to as a "logical EOD"). In this embodiment, since the last data might have been temporarily stored in the cartridge memory 24 without being written to the tape 23, the logical EOD might be a position on the tape 23 at which the last data is assumed to be written to the tape 23. The information pieces stored in the cartridge memory 24 also include: a physical EOD showing a position of the last data actually written to the tape 23 (hereinafter, referred to as a "physical EOD"); append data itself which is temporarily stored without being actually written to the tape 23; and a position at which the append data is assumed to be written to the tape 23. Furthermore, the information pieces include a movement omission flag showing whether or not a moving operation to be performed in response to the previous move command is omitted. Note that the movement omission flag is set to "ON" while the moving is omitted, and to "OFF" while the moving is not omitted. In this embodiment, the CM input/output unit 44 is provided as an example of a writing unit which writes data to the storage unit and also as an example of a reading unit which reads data from the storage unit. The operation signal output unit 45 outputs a signal to the motor driver 18 to instruct execution of a moving operation. In this embodiment, the operation signal output unit 45 is provided as an example of a movement control unit which performs control to suspend a moving operation.

Next, a description is given of an operation of the controller 16.

Figure 5:
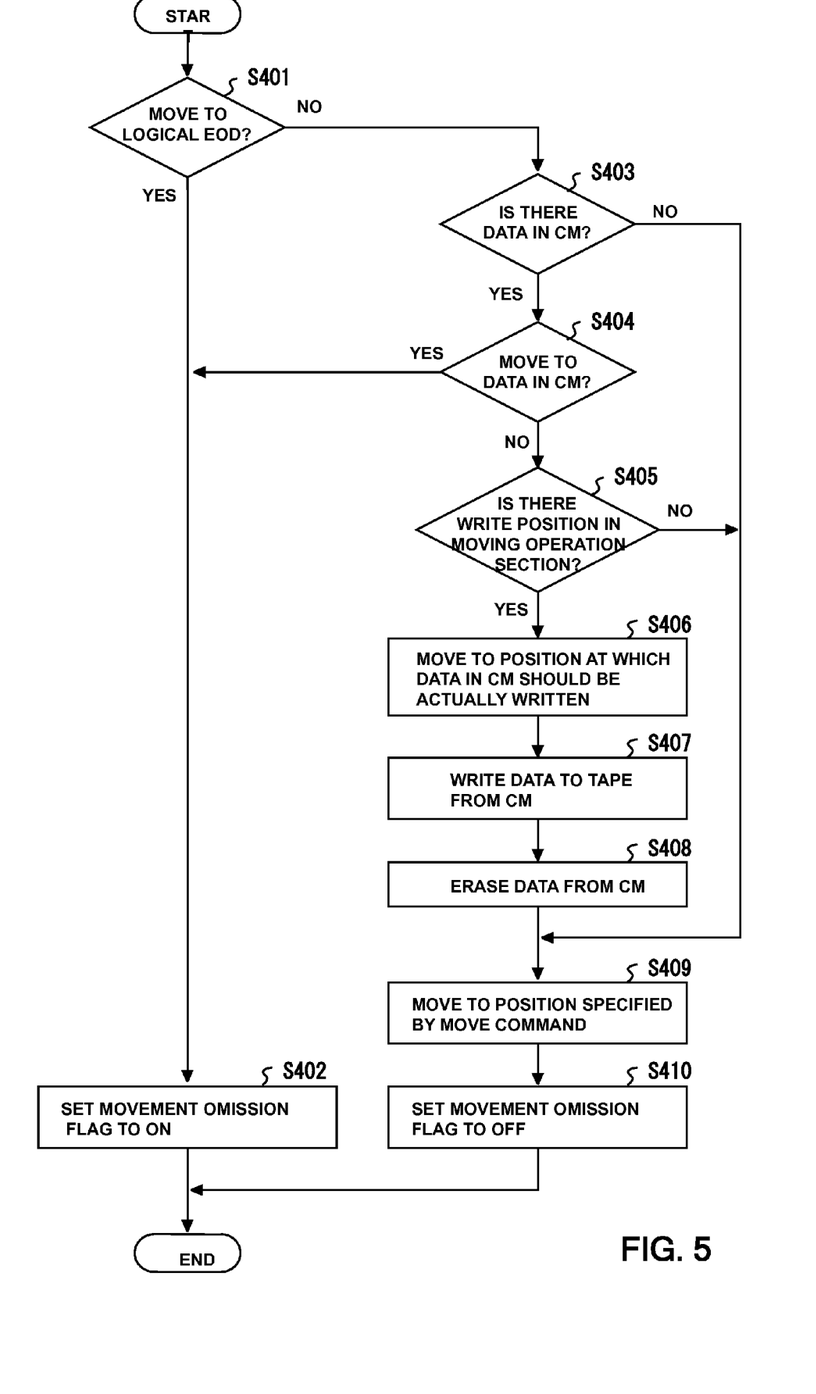
FIG. 5 is a flowchart showing an example of an operation of the controller at the time of receiving a move command in the embodiment of the present invention.

FIG. 5 is a flowchart showing an example of an operation of the controller 16 at the time when the command processor 41 receives a move command. When the command processor 41 notifies the CM input/output unit 44 of reception of a move command, the operation is thereby started.

In the controller 16, the CM input/output unit 44 first determines whether or not the move command gives an instruction for moving to a logical EOD (Step 401). Specifically, if the move command explicitly gives an instruction for moving to the EOD like a Space EOD command, the CM input/output unit 44 determines that the move command gives an instruction for moving to the logical EOD. If the move command gives an instruction for moving to the EOD by specifying an absolute position like a Locate command, the CM input/output unit 44 compares the logical EOD stored in the cartridge memory 24 with the absolute position specified by the Locate command. If there is a match, the CM input/output unit 44 determines that the move command gives an instruction for moving to the logical EOD.

If the move command is consequently determined to give the instruction for moving to the logical EOD, the CM input/output unit 44 omits the moving operation because an appending operation is highly likely to follow the moving operation. Subsequently, the CM input/output unit 44 sets the movement omission flag to "ON" (Step 402).

On the other hand, if the move command is not determined to give the instruction for moving to the logical EOD, the CM input/output unit 44 determines whether or not append data is stored in the cartridge memory 24 (Step 403). If append data is determined to be stored in the cartridge memory 24, the CM input/output unit 44 determines whether or not the move command gives an instruction for moving to append data in the cartridge memory 24 (Step 404). Specifically, like a Locate command, if the move command gives an instruction for moving to a specific position specified by using an absolute position, the CM input/output unit 44 compares the physical EOD and logical EOD which are stored in the cartridge memory 24 with the absolute position specified by the Locate command. If the absolute position is located between the physical EOD and the logical EOD, the CM input/output unit 44 determines that the move command gives an instruction for moving to the append data in the cartridge memory 24.

If the move command is determined to give an instruction for moving to the append data in the cartridge memory 24, the CM input/output unit 44 omits a moving operation on the tape 23 because an overwriting operation of the append data in the cartridge memory 24 is highly likely to follow the moving operation. Subsequently, the CM input/output unit 44 sets the moving omission flag to "ON" (Step 402).

On the other hand, if the move command is not determined to give an instruction for moving to the append data in the cartridge memory 24 in Step 404, the CM input/output unit 44 determines whether or not a section in which a moving operation is to be performed in accordance with the move command includes a position on the tape 23 at which the append data in the cartridge memory 24 should be actually written (proper position) (Step 405). Specifically, the CM input/output unit 44 determines whether or not a position at which append data stored in the cartridge memory 24 is to be actually written to the tape 23 exists between the current position and the position specified by the move command.

If the section in which the moving operation is to be performed in accordance with the move command is determined to include the position on the tape 23 at which the append data in the cartridge memory 24 should be actually written, the CM input/output unit 44 notifies the operation signal output unit 45 and the channel input/output unit 43 to that effect. Then, the operation signal output unit 45 outputs to the motor driver 18 a signal indicating moving to the position on the tape 23 at which the append data in the cartridge memory 24 is to be written (Step 406). The channel input/output unit 43 writes append data read from the cartridge memory 24 by the CM input/output unit 44 to the tape 23 at the position located after the moving (Step 407). Then, the CM input/output unit 44 erases the append data from the cartridge memory 24 (Step 408).

Subsequently, the CM input/output unit 44 notifies the operation signal output unit 45 that the append data in the cartridge memory 24 has been written to the tape 23 at the proper position. The operation signal output unit 45 outputs to the motor driver 18 a signal indicating moving to the position specified by the move command (Step 409). The CM input/output unit 44 sets the movement omission flag stored in the cartridge memory 24 to "OFF" (Step 410).

If append data is not determined to be stored in the cartridge memory 24 in Step 403, or if a section in which the moving operation in accordance with the move command is not determined to include the position of the tape 23 at which append data in the cartridge memory 24 should be actually written, the CM input/output unit 44 notifies the operation signal output unit 45 to that effect. The operation signal output unit 45 outputs to the motor driver 18 a signal indicating moving to the position specified by the move command (Step 409). Then, the CM input/output unit 44 sets the movement omission flag stored in the cartridge memory 24 to "OFF" (Step 410).

Figure 6:
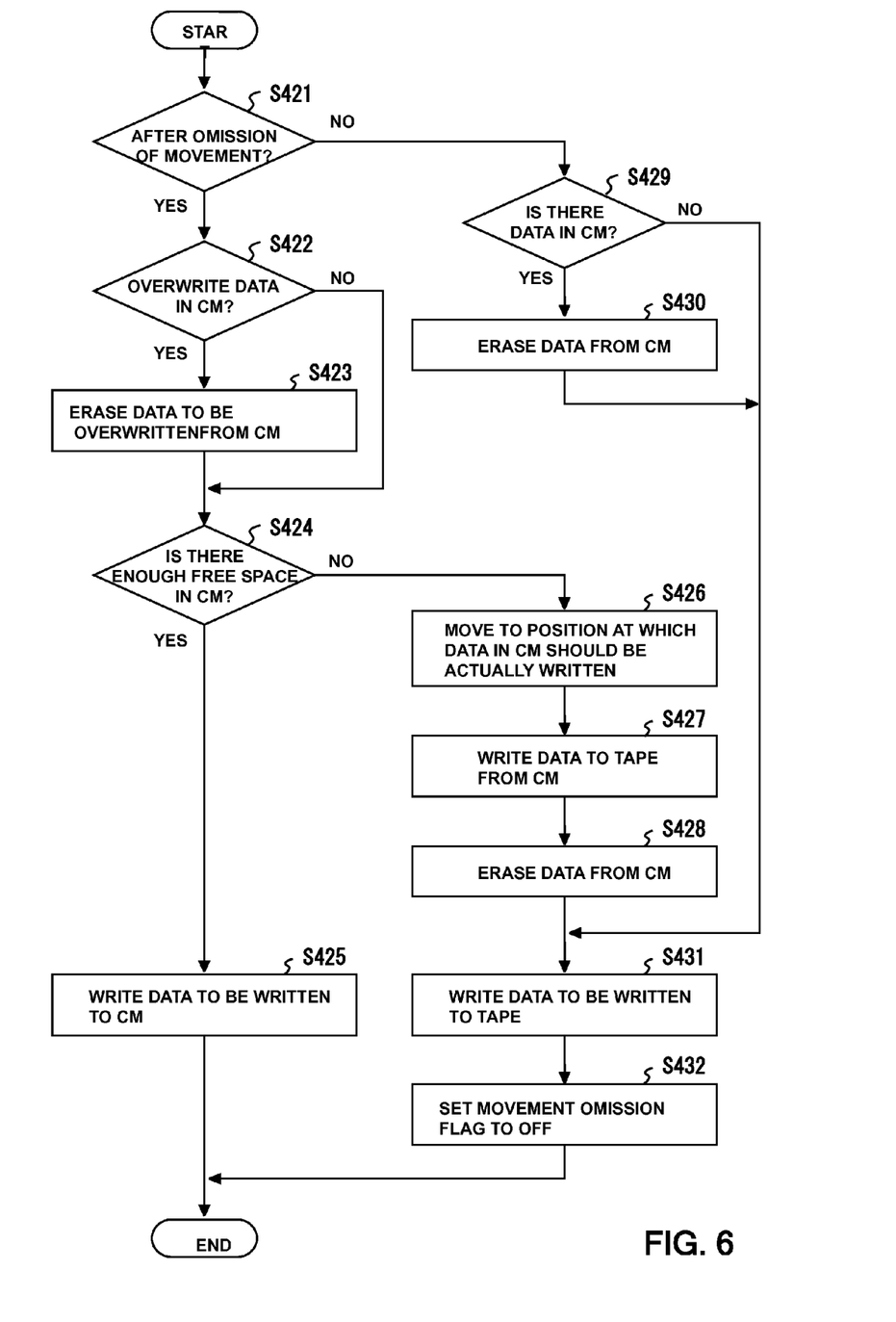
FIG. 6 is a flowchart showing an example of an operation of the controller at the time of receiving a write command in the embodiment of the present invention.

FIG. 6 is a flowchart showing an example of an operation of the controller 16 at the time when the command processor 41 receives a write command. When the command processor 41 notifies the CM input/output unit 44 of reception of a write command, the operation is thereby started.

In the controller 16, the CM input/output unit 44 first determines whether or not the current state is a state produced after omission of a movement, that is, whether or not the moving omission flag is set to "ON" (Step 421).

If the current state is consequently determined to be the state produced after moving omission of a movement, that is, if the moving omission flag is set to "ON," the current position is a logical EOD or a position in the cartridge memory 24 at which append data on the tape 23 should be written. Hence, the CM input/output unit 44 determines whether or not the current position is a position in the cartridge memory 24 at which append data on the tape 23 should be written (Step 422). Then, if the current position is determined to be a position in the cartridge memory 24 at which append data on the tape 23 should be written, the CM input/output unit 44 erases append data to be overwritten later from the cartridge memory 24 (Step 423). This is because the determination causes all or part of the append data in the cartridge memory 24 to be subjected to an overwriting operation following the moving operation. On the other hand, if the current position is not determined to be a position in the cartridge memory 24 at which append data on the tape 23 should be written, the processing proceeds to Step 424 without any operation.

Thereafter, the CM input/output unit 44 determines whether or not the cartridge memory 24 has a free space large enough to store the append data (Step 424).

If the cartridge memory 24 is determined to have a free space large enough to store the append data, the append data specified to be written by the write command is appended to the cartridge memory 24 (Step 425).

If the cartridge memory 24 is not determined to have a free space large enough to store the append data, the CM input/output unit 44 notifies the operation signal output unit 45 and the channel input/output unit 43 to that effect. The operation signal output unit 45 outputs to the motor driver 18 a signal indicating moving to the position on the tape 23 at which the append data in the cartridge memory 24 is to be written (Step 426). The channel input/output unit 43 writes append data read from the cartridge memory 24 by the CM input/output unit 44 to the tape at the position after the moving (Step 427). Then, the CM input/output unit 44 erases the append data from the cartridge memory 24 (Step 428). Subsequently, the channel input/output unit 43 writes the append data specified to be written by the write command, to the tape 23 (Step 431) in an ordinary manner. Thereafter, the CM input/output unit 44 sets the movement omission flag stored in the cartridge memory 24 to "OFF" (Step 432).

On the other hand, if the current state is not the state produced after omission of a movement, that is, if the moving omission flag is set to "OFF," the CM input/output unit 44 determines whether or not append data is stored in the cartridge memory 24 (Step 429). If append data is stored in the cartridge memory 24, the CM input/output unit 44 erases the append data from the cartridge memory 24 (Step 430). If no append data is stored in the cartridge memory 24, the processing proceeds to Step 431 without any operation. Then, the CM input/output unit 44 notifies the channel input/output unit 43 that no append data is stored in the cartridge memory 24, and the channel input/output unit 43 writes the append data specified to be written by the write command, to the tape 23 in an ordinary manner (Step 431). Thereafter, the CM input/output unit 44 sets the movement omission flag stored in the cartridge memory 24 to "OFF" (Step 432).

Figure 7:
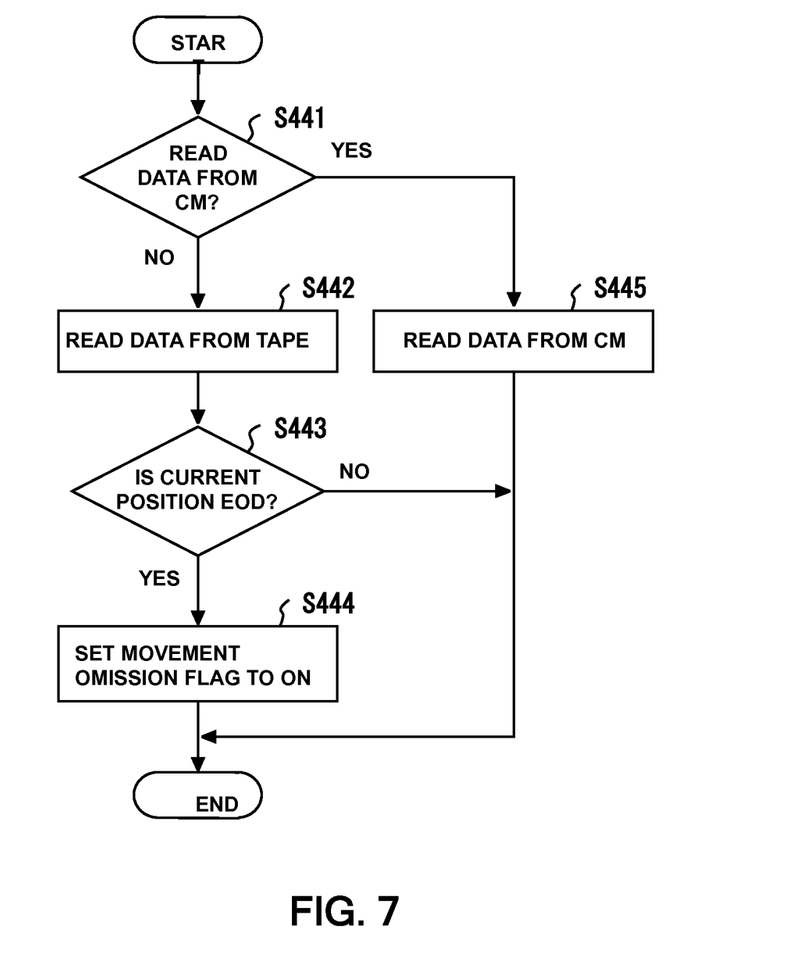
FIG. 7 is a flowchart showing an example of an operation of the controller at the time of receiving a read command in the embodiment of the present invention.

FIG. 7 is a flowchart showing an example of an operation of the controller 16 at the time when the command processor 41 receives a read command. When the command processor 41 notifies the CM input/output unit 44 of reception of a read command, the operation is thereby started.

In the controller 16, the CM input/output unit 44 first determines whether or not read target data specified by the read command is included in the cartridge memory 24 (Step 441).

If the read target data specified by the read command is not consequently determined to be included in the cartridge memory 24, the CM input/output unit 44 notifies the channel input/output unit 43 to that effect. The channel input/output unit 43 reads the data from the tape 23 in an ordinary manner (Step 442). Then, the CM input/output unit 44 determines whether or not the current position after the reading of the data is an EOD (a physical EOD in this case) (Step 443). If the current position is determined to be an EOD, the CM input/output unit 44 sets the movement omission flag to "ON" (Step 444). If the current position is not determined to be an EOD, the CM input/output unit 44 terminates the processing without any operation.

On the other hand, if the read target data specified by the read command is determined to be included in the cartridge memory 24 in step 441, the CM input/output unit 44 reads the read target data specified by the read command from the append data in the cartridge memory 24 (Step 445), and then terminates the processing.

In the above-described operation examples, the movement omission flag may be designed not to be set to "OFF" in Step 432 in FIG. 6 and not to be set to "ON" in Step 444 in FIG. 7.

As described above, in this embodiment, a moving operation is omitted in response to a moving request from which, for example, an appending operation is expected to occur next. In addition, append data is temporarily stored in the non-volatile storage area in response to an append request following the moving request, and is later written to the tape 23 at a proper position. This can shorten a time required for the moving operation on the tape 23 in writing data to the tape 23.

Here, the present invention may be implemented entirely by hardware or entirely by software. Moreover, the present invention can alternatively be implemented by both hardware and software. Furthermore, the present invention can be implemented as a computer, a data processing system or a computer program. This computer program can be provided by being stored in a computer-readable medium. Here, conceivable as the medium are electronic, magnetic, optical, electromagnetic, infrared, and semiconductor systems (devices or equipment) as well as a propagation medium. Moreover, examples of the computer-readable medium are a semiconductor and solid-state storage device, a magnetic tape, a removable computer diskette, a random access memory (RAM), a read only memory (ROM), a rigid magnetic disc and an optical disc. Current examples of the optical disk include a compact disc read-only memory (CD-ROM), a compact disc-rewritable (CD-R/W) and a DVD.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

The present invention can shorten a time required for a moving operation of a tape medium in writing data to the tape medium.

The present invention has been described by using the above-described embodiment. However, the technical scope of the present invention is not limited to the embodiment. It is apparent to those skilled in the art that various changes can be made in the embodiment and alternative embodiments can be employed without departing from the spirit and scope of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An apparatus for controlling writing data to a tape medium, comprising:
    a movement control unit that, even when a moving operation of the tape medium is instructed to locate a head to a position specified on the tape medium, performs control to suspend the moving operation of the tape medium if the specified position satisfies a predetermined condition; and
    a writing unit that, when an instruction to write data to the tape medium is issued while the moving operation is suspended under the control of the movement control unit, writes the data to a storage unit, the data in the storage unit being assigned to be written to the specified position on the tape medium, the storage unit being a buffer and enabling the writing to be ready to perform within a shorter time than a time required for the moving operation.

2. The apparatus according to claim 1, further comprising a reading unit that is configured to read the data from the storage unit when an instruction to read the data from the tape medium is issued.

3. The apparatus according to claim 1, further comprising a rewriting unit that rewrites the data written to the storage unit by the writing unit to the tape medium at the specified position to which the data in the storage unit is assigned.

4. The apparatus according to claim 3, wherein
    the storage unit is non-volatile, and
    the rewriting unit rewrites the data written to the storage unit by the writing unit to the tape medium at the specified position, after a tape cartridge including the tape medium unmounted from a tape drive is again mounted on the tape drive.

5. The apparatus according to claim 3, wherein
    the rewriting unit rewrites the data written to the storage unit by the writing unit to the tape medium at the specified position, when a free space of the storage unit satisfies a predetermined condition.

6. The apparatus according to claim 3, wherein the rewriting unit rewrites the data written to the storage unit by the writing unit to the tape medium at the specified position, when the head passes the specified position in a moving operation of the tape medium in a direction of writing the data.

7. A method for controlling writing data to a tape medium, comprising the steps of:
when a moving operation of the tape medium is instructed to locate a head to a first position on the tape medium, omitting the moving operation; and
writing first data to a storage unit, the data in the storage unit being assigned to be written to the first position on the tape medium when an instruction to write the first data to the tape medium is issued while the moving operation is being omitted, the storage unit being a buffer and enabling the writing to be ready to perform within a shorter time than a time required for the moving operation.

8. The method of claim 7, further comprising the step of:
reading second data written to the tape medium and ended at a second position which is farther from a beginning of the tape medium than the first position is.

9. The method of claim 8, further comprising the step of:
rewriting the first data written to the storage unit to the tape medium at the first position to which the first data in the storage unit is assigned, when the tape medium is rewound from the second position.

10. The method of claim 9, wherein the step of rewriting further comprises:
rewriting the first data written to the storage unit by the writing unit to the tape medium at the first position, after a tape cartridge including the tape medium unmounted from a tape drive is again mounted on the tape drive.

11. The method of claim 9, wherein the step of rewriting further comprises:
rewriting the first data written to the storage unit by the writing unit to the tape medium at the first position, when a free space of the storage unit satisfies a predetermined condition.

12. The method of claim 9, wherein the step of rewriting further comprises:
rewriting the first data written to the storage unit by the writing unit to the tape medium at the first position, when the head passes the first position in a moving operation of the tape medium in a direction of writing the data.

13. A computer program product on a physical non-transitory computer-readable medium for controlling writing data to a tape medium, the product comprising:

computer code for suspending a moving operation of the tape medium that has been instructed to locate a head to a position specified on the tape medium if the specified position satisfies a predetermined condition; and
computer code for writing data to a storage unit, the data in the storage unit being assigned to be written to the specified position on the tape medium when an instruction to write data to the tape medium is issued while the moving operation is suspended, the storage unit being a buffer and enabling the writing to be ready to perform within a shorter time than a time required for the moving operation.

14. The computer program product of claim 13, further comprising:
computer code for reading second data written to the tape medium and ended at a second position which is farther from a beginning of the tape medium than the first position is.

15. The computer program product of claim 13, further comprising:
computer code for rewriting the first data written to the storage unit to the tape medium at the first position to which the first data in the storage unit is assigned, when the tape medium is rewound from the second position.

16. The computer program product of claim 15, wherein the computer code for rewriting further comprises computer code for rewriting the first data written to the storage unit by the writing unit to the tape medium at the first position, after a tape cartridge including the tape medium unmounted from a tape drive is again mounted on the tape drive.

17. The computer program product of claim 15, wherein the computer code for rewriting further comprises computer code for rewriting the first data written to the storage unit by the writing unit to the tape medium at the specified position, when a free space of the storage unit satisfies a predetermined condition.

18. The computer program product of claim 15, wherein the computer code for rewriting further comprises computer code for rewriting the first data written to the storage unit by the writing unit to the tape medium at the first position, when the head passes the first position in a moving operation of the tape medium in a direction of writing the data.

19. A tape cartridge for use with a tape drive, comprising:
a tape medium to which data is to be written; and
a storage unit which enables writing to be ready to perform within a shorter time than a time required for a moving operation of the tape medium for locating a head to a position specified on the tape medium, and stores data instructed to be written to the tape medium, the data being assigned to be written to the specified position, while the moving operation is being omitted.

* * * * *